United States Patent [19]
Fletcher et al.

[11] 3,869,680
[45] Mar. 4, 1975

[54] DUALLY MODE-LOCKED ND:YAG LASER

[76] Inventors: James C. Fletcher, Administrator of the National Aeronautics and Space Administration, with respect to an invention of; John Osmundson, 100 E. Middlefield Rd., Apt. 1K, Mountain View, Calif. 94040; H. Edward Rowe, General Delivery, Laurel, Md. 20810; Dominick Santarpia, 13111 Taney Dr., Beltsville, Md. 20705

[22] Filed: Aug. 31, 1973

[21] Appl. No.: 393,528

[52] U.S. Cl. .......................................... 331/94.5 M
[51] Int. Cl. ............................................... H01s 3/10
[58] Field of Search ................................... 331/94.5

[56] References Cited
UNITED STATES PATENTS

| | | | |
|---|---|---|---|
| 3,423,695 | 1/1969 | Boyden | 331/94.5 Q |
| 3,521,069 | 7/1970 | DeMaria et al. | 331/94.5 Q |
| 3,521,188 | 7/1970 | Sooy | 331/94.5 Q |

*Primary Examiner*—William L. Sikes
*Attorney, Agent, or Firm*—Robert F. Kempf; John R. Manning

[57] ABSTRACT

A dually mode-locked laser system is disclosed, the laser system being of the general type including a laser cavity defined by a pair of at least partially relecting mirrors with a laser material disposed in the cavity. A loss modulator mode-locking element and a phase modulator mode-locking element are disposed in the laser cavity in optical series with one another. Modulation drive signals are provided for each mode-locking element such that each mode-locking element produces an output pulse train of substantially the same repetition rate and wherein the output pulse train is in a timed inter-relationship such that the pulses pass through both mode-locking elements without being extinguished. The loss mode-locker is driven at a low level so that relaxation oscillations do not occur and forces the pulses generated by the phase mode-locker to maintain a constant phase relative to the mode-lock drive signal. The laser system can be run both open loop and with a phase-lock stabilization feedback loop.

9 Claims, 3 Drawing Figures

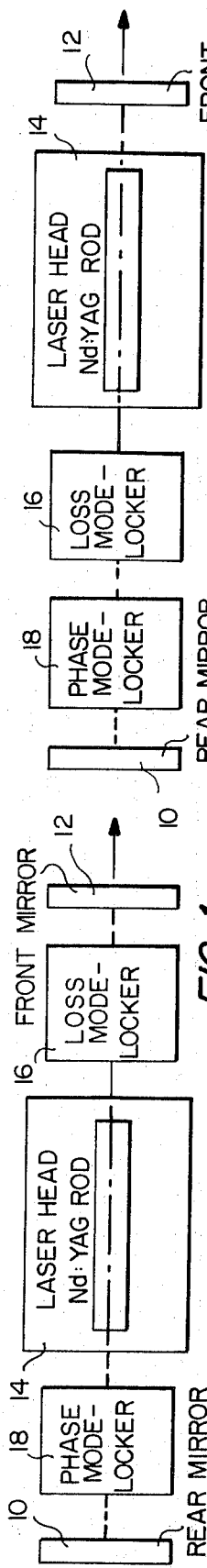
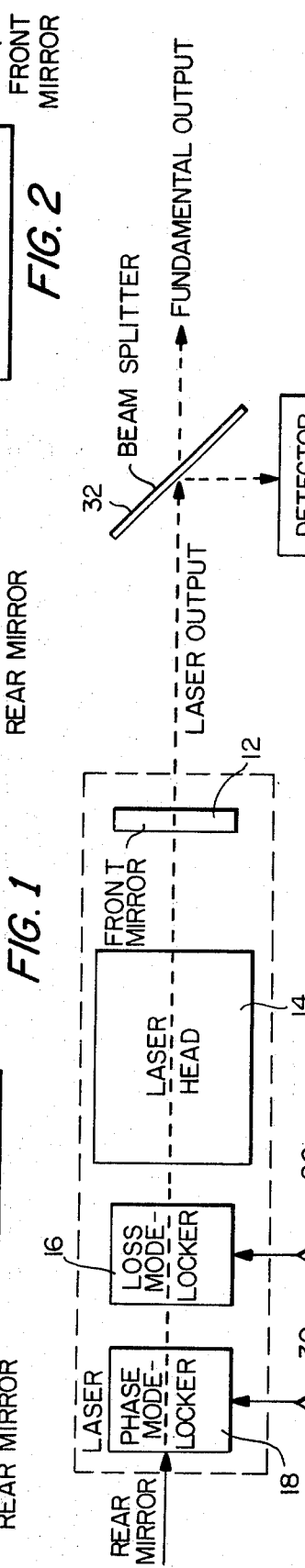
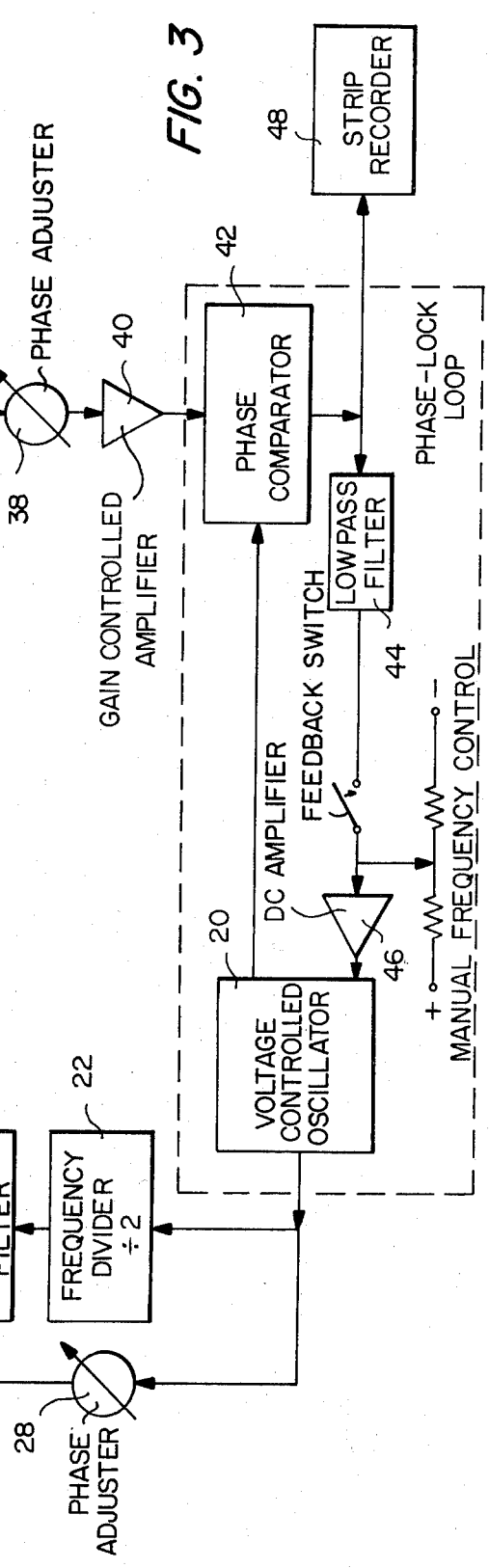

DUALLY MODE-LOCKED ND:YAG LASER

ORIGIN OF THE INVENTION

The invention described herein was made in the performance of work under a NASA contract and is subject to the provisions of Section 305 of the National Aeronautics and Space Act of 1958, Public Law 85–568 (72 STAT 435; 42 USC 2,457).

BACKGROUND OF THE INVENTION

This invention generally relates to laser systems, and particularly concerns a method and apparatus for effecting dual mode-locking of pulsed laser systems.

Mode-locked Nd:YAG lasers, such as Nd:YAG lasers, have been contemplated for use as transmitters in pulse coded modulated optical communication systems. In such communication systems, a modulator external to the laser transmitter either passes or blanks each mode-locked pulse according to a binary coding scheme, thus producing a stream of ones and zeros at an optical receiver. Typically, the probability of error in the received signal can be minimized by using special techniques such as gating the optical detector and setting a detector threshold level. However, the ease with which these techniques can be implemented depends on the stability of the width, amplitude, and repetition rate of the mode-locked pulses.

In this respect, mode-locking can be accomplished by applying an internal time varying amplitude or phase perturbation to the laser such that output pulses are produced at a repetition rate, $f_m$, given approximately by $$f_m = c/2L,$$

where $c$ is the speed of light in vacuum and $L$ is the optical length of the laser cavity. The drive frequency applied to the amplitude or phase perturbation must be exactly matched to the laser cavity length in order to have good pulse amplitude, repetition rate, and width stability. Since the laser cavity continuously varies in length due to thermal expansion and contraction, and acoustical effect, stabilization can be achieved only by continuously compensating for these effects.

Stabilization of the mode-locking has been achieved by numerous different methods. For example, length stabilization can be utilized which involves keeping the drive frequency to the intra-cavity perturbation fixed and maintaining the laser cavity length at a fixed length with an electronic servo system. This method introduces some complexity in the laser design since one mirror of the resonator cavity must be movable.

Another stabilization method is a simple feedback loop which detects the mode-locked pulses and uses the amplified detector output as the drive signal to the laser mode-locker. Still a further method utilizes a phase-lock loop which compares the detected output of the laser to the signal applied to the mode-locker, and uses the resultant error signal to correct the drive of the mode-locked. These latter two methods exhibit the same disadvantages in that neither can easily be used with a loss modulator mode-locking element since time varying losses inside the cavity introduce relaxation oscillation noise on the laser output, as is known, which, in turn, produces instabilities in the feedback loops. When a loss modulator is driven hard enough to produce short mode-locked pulses, the instabilities can cause these feedback systems to lose lock.

Phase modulator mode-locking elements can also introduce instabilities in feedback systems since the mode-locked pulses can be in or out of phase with the modulator drive. This causes random phase shifts of 180°, or doubling of the repetition rate of the output pulses, both of which are undesirable in a communication system.

Accordingly, and regardless of the type of mode-locking effected, whether the mode-locking be achieved by a so-called loss modulator mode-locking element, or by a so-called phase modulator mode-locking element, difficulties have been encountered in achieving and maintaining suitable stabilization which thus hinders the utilization of the mode-locked lasers in optical communication systems.

SUMMARY OF THE INVENTION

It is thus apparent that a need exists in this art whereby stable mode-locking can be achieved for a pulsed laser system in a simple manner and without encountering the typical disadvantages which are associated with the separate utilization of the conventional loss mode-locker, or phase mode-locker of the prior art. It is the primary objective of the instant invention to provide a method and apparatus by which the requisite stable mode-locking can be achieved.

A further objective of the instant invention concerns the provision of a method and apparatus for mode-locking a pulsed laser system, such mode-locking exhibiting no relaxation oscillations or phase ambiguity and being achieved with no loss of stabilization.

These objectives, as well as others which will become apparent as the description proceeds, are implemented by the instant invention which is particularly concerned with a novel method and apparatus for effecting mode-locking of a pulsed laser system of the type including a laser cavity defined by a pair of at least partially reflecting mirrors with a active gain lasing medium, such as Nd: YAG, disposed in the cavity.

In accordance with the teachings of the invention, a conventional loss modulator mode-locking element and a conventional phase modulator mode-locking element are disposed in the laser cavity in optical series with one another, thus effecting a dual mode-locking of the laser. Modulation drive signals are generated and provided for each of the mode-locking elements such that each mode-locking element produces an output pulse train of substantially the same repetition rate, the output pulse trains being produced in timed interrelationship such that the pulses pass through both mode-locking elements without being extinguished.

The loss modulator mode-locking element is contemplated to operate at a low level so that the mode-locked pulses are extremely wide and no relaxation oscillation noise exists. When run in this condition, the loss modulator mode-locking element effectively acts as a "gate" which forces the phase modulator mode-locking element to produce pulses with constant phase relative the mode-lock drive signal. The dually mode-locked laser of the invention can be run either open loop or with a conventional phase-lock stabilization feedback loop and, in either case, no relaxation oscillations or phase ambiguity occurs and there is no loss of stabilization.

BRIEF DESCRIPTION OF THE DRAWINGS

The invention will be better understood, and further features and advantages will become apparent, from the following detailed description of the preferred inventive embodiment, such description making reference to the appended sheet of drawings, wherein:

FIG. 1 is a schematic diagram of a pulsed laser system utilizing the dual mode-locking teachings of the invention, such representation illustrating one preferred placement of the mode-locking elements within the laser cavity;

FIG. 2 is a schematic representation similar to that of FIG. 1, but illustrating a different disposition of the two mode-locking elements within the laser cavity; and FIG. 3 is a functional block diagram of a laser system equipped with the dual mode-locking apparatus of the instant invention and further utilizing a typical feedback stabilization loop.

DETAILED DESCRIPTION OF THE PREFERRED INVENTIVE EMBODIMENT

So as to achieve a fuller understanding of the teachings of the instant invention, and particularly so as to appreciate the theoretical significance of utilizing both a phase mode-locker and a loss mode-locker in optical series with one another, the following mathematical development and discussion will be useful.

For a laser of optical cavity length L, a phase modulator mode-locking element of conventional construction would be run at a modulation frequency given approximately by $$f_{FM} = 2L/c \pm 2\delta/\pi(\lambda/c) + (1/\Delta f)\, ln[1/R]]^{-1} \quad (1)$$

where $\delta$ is the depth of modulation of the phase mode-locker, $\Delta f$ is the frequency width of the gain curve of the active lasing medium, $R$ is the power reflectivity of the laser output mirror, including losses, and $\lambda$ is the wavelength of the laser radiation.

The mode-locked power at any instant of time over one pulse period for a phase mode-locked laser is given by $$P(t)_{FM} = P_o\, \exp\,(-\alpha_{FM} t^2), \quad (2)$$

where $\alpha_{FM}$ is a constant and $P_o$ is the peak power of a single mode-locked pulse.

For a conventional loss modulator mode-locking element the loss mode-locker modulation frequency is given approximately by $$f_{AM} = 1/2\,[2L/c + 1/\Delta f\, ln\,[1/R]]^{-1} \quad (3)$$

However, the output pulse repetition rate is twice the modulation frequency given in Eq. (3), or $2f_{AM}$. For this case, the mode-locked power at any instant of time over one pulse period is given by $$P(t)_{AM} = P_o\, \exp\,(-\alpha_{AM} t^2), \quad (4)$$

where $\alpha_{AM}$ is a constant.

With reference now to the application drawings, and specifically to FIGS. 1 and 2 thereof, schematic illustrations can be found of two different laser cavity configurations, each utilizing a series combination of conventional loss and phase mode-lockers in accordance with the teachings of the instant invention. As is shown, the pulsed laser system to which the instant invention relates is of a conventional variety including a laser cavity defined by a pair of at least partially reflecting mirrors 10 and 12 with a laser material 14 disposed in the cavity, the laser material or laser head comprising, for example, a Nd:YAG rod. In each instance as is shown in FIGS. 1 and 2, a loss modulator mode-locking element 16 of conventional construction and a phase modulator mode-locking element 18 of conventional construction is disposed in the laser cavity in optical series with one another to effect a simultaneous or dual loss mode-locking and phase mode-locking. The specific location of the phase mode-locker and the loss mode-locker within the laser cavity can be varied, however, in accordance with the teachings of the instant invention.

For example, in FIG. 1, the phase modulator mode-locking element 18 is disposed adjacent to the rear mirror 10 of the laser cavity, and the loss modulator mode-locking element 16 is disposed adjacent to the front mirror 12. In this respect, the disposition of the mode-locking elements is in accordance with the well-known condition that a mode-locker should be disposed as close as possible to an end mirror, the theoretical basis for such a disposition being found in the literature. With particular reference to FIG. 2, it should be noted that the phase modulator mode-locking element 18 is disposed adjacent to the rear mirror 10 as was the case with respect to FIG. 1, the loss modulator mode-locking element 16 being disposed just to the right of the phase mode-locker.

To implement the dual mode-locking system of the instant invention, wherein a phase mode-locker and a loss mode-locker are utilized together in optical series within the laser cavity, it is important that the two mode-lockers be driven at different modulation frequencies such that each mode-locker produces an output pulse train having substantially the same repetition rate. In this respect, the difference in modulation frequency drives to the respective mode-lockers is given from Equations (1) and (3) as $$\Delta f = 2f_{AM} - f_{FM} = \pm\, \delta\pi c/2L^2\pi. \quad (5)$$

Further, the mode-locked pulses must be properly timed, i.e., a timed inter-relationship must exist between such pulses, such that the pulses can pass through both of the mode-lockers without being extinguished. For example, a mode-locked pulse leaving the phase modulator mode-locking element 18 and propagating toward the loss modulator mode-locking element 16 must arrive at the loss modulator mode-locking element when transmission through the loss mode-locker is at a maximum. This timing can be readily adjusted by simiply adjusting the phase of the modulation signal applied to one of the two mode-lockers, the modulation signals applied to each respective mode-locker exhibiting a frequency difference as above-discussed. For example, both the phase mode-locker and the loss mode-locker of FIGS. 1 and 2 could be driven by the same source of modulation signals such as an oscillator, the phase of the signal to one of the mode-lockers such as the phase mode-locker being adjustable.

Assuming no frequency off-set between the loss modulator mode-locking element and the phase modulator mode-locking element and further assuming perfect timing of the mode-locked pulses in the laser cavity, the mode-locked pulses or output from such a dual mode-locking system in accordance with the instant invention will be given by $$P(t)_{AM \& FM} = P_o \exp(-\alpha t^2), \quad (6)$$

where $\alpha = \alpha_{AM} + \alpha_{FM}$.

Particular reference is now made to FIG. 3 of the application drawings, wherein a typical pulsed laser system is disclosed utilizing the dual mode-locking techniques of the instant invention, this laser system also incorporating therein a conventional feedback stabilization loop for modifying the modulation drive signals to the mode-lockers in response to the laser output. It should be appreciated, however, that the pulsed laser system of the FIG. 3 as well as the specific type of feedback stabilization loop disclosed therein is exemplary only.

In the embodiment of FIG. 3, the laser element 14 is contemplated to comprise a Holobeam 250-2RTA element pumped in a double elliptical cavity by two krypton lamps and operated in the $TEM_{oo}$ mode. The phase mode-locker 18 may use a barium sodium niobate crystal as the mode-locking element as is conventional. The rear surface of the barium sodium niobate crystal has a 99.7% reflective coating and thus acts as the end of rear mirror in the laser cavity. The loss mode-locker 16 can comprise a conventional acousto-optical modulator which has a very low insertion loss.

The modulation drive sources for both mode-locking elements can be obtained from a stable voltage controlled oscillator (VCO) 20, operating at about 273 MHz. The output of the oscillator 20 is split, one portion of which is frequency divided by two in element 22, filtered by filter 24, amplified by element 26, and applied to the loss mode-locker 16. The other portion of the oscillator output is shifted in phase by phase adjuster 28 to synchronize the transmission time of each mode-locker, amplified by amplifier 30 and then applied to the phase mode-locker 18.

The modulation frequency difference between the two mode-lockers cannot exactly be compensated for when the same source is used to drive both mode-lockers, as opposed to utilizing two separate drive sources. However, it can be assumed that the loss mode-locker is used only to sinusoidally modulate the optical beam. For this case, the loss modulator 16 is not driven at exactly the mode-lock frequency given by Equation (3) but is detuned by an amount given in Equation (5). Also, for this case, the condition that the loss modulator be very close to an end mirror need not be met, and the above-discussed timing requirement of optical pulses through the loss mode-locker becomes less stringent. The primary disadvantage in detuning the loss modulator in this manner is that the pulses generated by the dually mode-locked laser are slightly broader than when both mode-lockers are driven at their optimum frequencies. It is possible, however, with additional complexity to the phase-lock loop, to drive the two mode-lockers at different frequencies and still maintain coherency between both drive sources. Reference is again made to the literature.

As the laser cavity length varies, the resulting mismatch between cavity length and mode-lock drive frequency causes the mode-locked pulses to broaden and change in phase relative to the mode-lock drive. A change in relative phase between the mode-locked pulses and the mode-locker drive signal then gives a measure of the instability of mode-locking.

In the exemplary embodiment of FIG. 3, a phase-lock stabilization loop is provided as is conventional. In this respect, the mode-locked laser output is split by a beamsplitter 32. One portion of the beam comprises the fundamental laser output and the other portion is detected by a high speed photomultiplier 34. The output of the photomultiplier 34 is filtered in filter 36, phase shifted by phase adjuster 38, and amplified by a gain controlled amplifier 40. The amplifier output is fed to a second order phase-lock loop comparator 42 which compares the phase of the detected laser signal with the phase of the mode-locker drive signal from voltage controlled oscillator 20. The output of the phase comparator 42 is a measure of the phase difference of its two inputs and therefore is a measure of the change in the laser optical cavity length and its effect on mode-locked pulse width. This error voltage is filtered by a low pass filter 44 which suppresses noise and high frequency components. The filter also helps to establish the dynamic performance of the loop. The filtered error signal is then amplified by the loop D.C. amplifier 46 and applied to the voltage controlled oscillator 20, thereby changing the frequency of the voltage controlled oscillator 20 in a direction that reduces the effect that laser cavity length changes have on pulse broadening.

The phase comparator output may also be recorded on a strip chart 48 to give a continuous record of the stability of mode-locking. The phase adjuster 38 between the filter and the phase comparator allows a reference to be established at the output of the phase comparator.

In the dual mode-locking system of the instant invention, the loss mode-locker 16 is driven at a very low level so that the mode-locked pulses are extremely wide and such that there is no relaxation oscillation noise. When run in this condition, the loss mode-locker 16 acts as a gate, forcing the phase mode-locker 18 to always remain in phase with the mode-lock drive signal.

It should be appreciated that the dual mode-locking of the invention provides a simple technique for achieving stable mode-locking without suffering the disadvantages that occur when either the loss or phase mode-locker is utilized separately. Brewster cut optical surfaces, narrow mode-locked pulses, and critical optical alignment are not required for stable mode-lock operation. Further, the duel mode-locking technique of the invention can be utilized with any of the conventional mode-locked laser feedback stabilization systems, one of which has been shown in FIG. 3. Initial testing results, however, indicate that a dual mode-locked laser of the type described herein may not even require additional stabilization.

From the foregoing detailed description, it should be apparent that all the objectives set forth at the outset of this specification have been successfully achieved. Moreover, while there has been shown and described a present preferred embodiment of the invention, it is to be distinctly understood by those skilled in the art that the invention is not limited thereto, but may otherwise be variously embodied and practiced within the scope of the folowing claims. Accordingly,

What is claimed is:

1. A method of mode-locking a pulsed laser system of the type including a laser cavity defined by a pair of at least partially reflecting mirrors with an active gain lasing medium disposed in the cavity, said method comprising the steps of:

inserting a loss-modulator mode-locking element and a phase modulator mode-locking element into the laser cavity in optical series with one another to effect simultaneous loss mode-locking and phase mode-locking;

generating modulation drive signals to each mode-locking element such that each mode-locking element produces an output pulse train of substantially the same repetition rate; and timing the mode-locked pulses so produced such that the pulses leaving the phase modulator mode-locking element and propagating toward the loss modulator mode-locking element arrive at the loss modulator mode-locking element when transition through the loss mode-locker is at a maximum.

2. A method as defined in claim 1, wherein the step of timing the mode-locked pulses comprises phase shifting the modulation drive signals to one of the two mode-locking elements.

3. A method as defined in claim 1, wherein at least one of the mode-locking elements is positioned adjacent a mirror within the laser cavity.

4. A method as defined in claim 1, further including the step of stabilizing the mode-locked pulses by providing a phase lock loop responsive to the laser output to control the modulation drive signals generated.

5. In a pulsed laser system wherein an active gain lasing medium is disposed in a laser cavity defined by a pair of at least partially reflecting mirrors, the improvement whereby dual mode-locking of the laser output pulses is obtained, said improvement comprising, in combination:

a loss modulator mode-locking element and a separate phase modulator mode-locking element disposed in the laser cavity in optical series with one another; and generating means for generating modulation drive signals to each mode-locking element.

6. A system as defined in claim 5, wherein at least one of said mode-locking elements is disposed adjacent a mirror of said pair.

7. A system as defined in claim 6, wherein said generating means includes oscillator means for producing modulation drive signals having a different frequency to each respective mode-locking element, the frequency difference between the respective drive signals being selected to effect an output pulse from each mode-locking element of substantially the same repetition rate.

8. A system as defined in claim 7, wherein said generating means further includes a phase shifter disposed between the output of said oscillator means and one of said mode-locking elements for shifting the phase of the modulation drive signal to said one mode-locking element whereby the output pulses of each mode-locking element are produced in a timed interrelationship so as to pass through both mode-locking elements without being extinguished.

9. A system as defined in claim 8, further including a feedback stabilization loop means for modifying the modulation drive signals in response to the laser output.

* * * * *